US012219351B2

United States Patent
Balasubramanian et al.

(10) Patent No.: US 12,219,351 B2
(45) Date of Patent: Feb. 4, 2025

(54) RECLAIMING OF A PROVISIONED CREDENTIAL ON USER EQUIPMENT

(71) Applicant: Celona, Inc., Cupertino, CA (US)

(72) Inventors: Srinivasan Balasubramanian, San Diego, CA (US); Rajeshwar Ponna, San Jose, CA (US)

(73) Assignee: Celona, Inc., Cupertino, CA (US)

( * ) Notice: Subject to any disclaimer, the term of this patent is extended or adjusted under 35 U.S.C. 154(b) by 359 days.

(21) Appl. No.: 17/697,258

(22) Filed: Mar. 17, 2022

(65) Prior Publication Data

US 2022/0303768 A1  Sep. 22, 2022

Related U.S. Application Data

(60) Provisional application No. 63/279,002, filed on Nov. 12, 2021, provisional application No. 63/162,422, filed on Mar. 17, 2021.

(51) Int. Cl.
*H04W 12/06* (2021.01)
*H04W 8/18* (2009.01)
*H04W 12/72* (2021.01)

(52) U.S. Cl.
CPC .......... *H04W 12/06* (2013.01); *H04W 8/183* (2013.01); *H04W 12/72* (2021.01)

(58) Field of Classification Search
CPC ....... H04W 12/06; H04W 12/72; H04W 8/18; H04W 8/183
See application file for complete search history.

(56) References Cited

U.S. PATENT DOCUMENTS

| 2010/0124196 | A1* | 5/2010 | Bonar | H04B 7/0689 |
| | | | | 455/445 |
| 2015/0163731 | A1* | 6/2015 | Kotecha | H04W 4/24 |
| | | | | 455/432.1 |
| 2016/0174065 | A1 | 6/2016 | Li et al. | |
| 2016/0277930 | A1* | 9/2016 | Li | H04L 41/28 |
| 2018/0295500 | A1* | 10/2018 | Yang | H04W 60/00 |

(Continued)

OTHER PUBLICATIONS

Kim, Harry, International Search Report and Written Opinion received from the USRO dated Jun. 15, 2022 for appln. No. PCT/US2022/020741, 12 pgs.

*Primary Examiner* — Kashif Siddiqui
(74) *Attorney, Agent, or Firm* — Jaquez Land Greenhaus & McFarland, LLP; Bruce W. Greenhaus

(57) ABSTRACT

Methods and apparatus for managing user subscription credentials provisioned to user equipment (UEs) and to be released at some future time for reuse and repurposing are disclosed. The methods and apparatus allow previously provisioned UE credentials to be deleted from both the UEs and from the wireless network components that manage and maintain the UE credentials. Four specific methods and apparatus for provisioning UEs with SIM credentials and reclaiming of provisioned credentials are described in detail: (1) a validity timer-based approach to provisioning UEs with SIM credentials and reclaiming of provisioned credentials; (2) a release command-based approach to provisioning UEs with SIM credentials and reclaiming of provisioned credentials; (3) a user-initiated release of previously provisioned SIM credentials; and (4) a Mobile Device Management (MDM) methodology-based approach to provisioning UEs with SIM credentials and reclaiming of provisioned credentials.

5 Claims, 14 Drawing Sheets

(56) References Cited

U.S. PATENT DOCUMENTS

2021/0067931 A1  3/2021  Lankalapalli et al.
2022/0141643 A1* 5/2022  Balasubramanian ........................ H04W 12/06
                                                                 455/558

* cited by examiner

RECLAIMING OF A PROVISIONED CREDENTIAL ON USER EQUIPMENT

CLAIM OF PRIORITY TO PREVIOUSLY FILED PROVISIONAL APPLICATIONS—INCORPORATION BY REFERENCE

This utility application claims priority under 35 USC section 111 (b) and under 35 USC section 119 (e) to earlier-filed provisional application No. 63/162,422 filed Mar. 17, 2021, entitled "Reclaiming of a Provisioned Credential on User Equipment", and this utility application also claims priority under 35 USC section 111 (b) and under 35 USC section 119 (e) to earlier-filed provisional application No. 63/279,002 filed Nov. 12, 2021, entitled "Reclaiming of a Provisioned Credential on User Equipment"; and both provisional applications cited above (App. Nos. 63/162,422 and 63/279,002) are hereby incorporated by reference herein as if set forth in full.

BACKGROUND

(1) Technical Field

The disclosed methods and apparatus relate generally to systems, techniques, and mechanisms for managing access to a wireless communication network. In particular, the disclosed methods and apparatus relate to allowing subscription credentials provisioned to user equipment (UEs) to be released for reuse.

(2) Background

The current 3rd Generation Partnership Project (3GPP) and Global System for Mobile Communications Association (GSMA) standards forums are typically directed to writing specifications for Subscription management for large Mobile Network Operators (MNOs) that typically have nationwide coverage hosting a large number of users. Such MNOs typically intend the subscription credentials to be assigned and maintained by the same user indefinitely. Currently, short term use of a given credential which can be assigned and later reclaimed for reuse by another user does not exist. Therefore, it would be advantageous to provide methods and apparatus that allow short term assignment and later reclamation of subscriber credentials.

Typically, when an MNO authorizes a user equipment (UE) (such as, for example, a cellular telephone) to access the MNO network, a Subscriber Identify Module (SIM) card is provisioned with relevant credentials uniquely assigned to the UE. Information corresponding to the credentials is populated in the Home Subscriber Server (HSS) of an Evolved Packet Core (EPC) in a Fourth Generation (4G) Long-Term Evolution (LTE) network or a Unified Data Management (UDM) of a Fifth Generation (5G) New Radio (NR) network. The HSS/UDM resides in the home operator's network in a central database. Load balancing and ensuring high-availability are handled by replicating databases having the relevant information. Synchronization of these databases is performed by periodic "commits" across the entities in which the information is maintained.

SIM Cards—

A SIM card is otherwise known as a "subscriber identity module" and is used in smartphones globally. For example, SIM cards store data for subscribers of GSM cellular phones. GSM stands for Global System for Mobile communication and is a digital mobile network that is commonly used in Europe, Asia, Africa, and most of the rest of the world. The U.S. is one exception and uses both GSM and CDMA (Code Division Multiple Access).

Phones on the GSM network can use any carrier's network, lowering the costs for the carriers and users alike. Europe mandated the use of GSM in 1987. SIM cards are small integrated circuits that are manually inserted into user equipment such as cell phones. SIM cards contain a chip (or integrated circuit, "IC") and is removable and transferable to other phones. For a GSM cell phone to work properly, a SIM card must be inserted into it so a user can gain access to a local mobile network to place or receive calls or text messages.

One advantage of using GSM is that any carrier must accept the calls and/or text made by a user. The opposite is true for CDMA phones—with CDMA phones, a user cannot decide to switch to a new phone without a carrier's permission. For example, carriers using CDMA do not have to accept a user's phone onto its network.

SIM cards basically look like tiny pieces of plastic. The SIM "piece of plastic" includes a small integrated chip (or "integrated circuit"; 'IC') that holds a unique identification number, phone number and other data that links to the consumer/user of the cell phone or user equipment (UE).

SIM cards contain a variety of information, such as who is paying for access to a wireless network and that a user has permission to use network features such as placing a call or sending a text. Because SIM cards hold the subscriber's information, they are useful when the battery on a user's cell phone is low or needs to be recharged. The user can remove the SIM card from the cellular phone and place it into another cell phone and send a text or make/receive another call. Because a user has the same SIM card installed on the second cell phone, any calls or texts will originate and terminate at the user's same cell telephone number. It does not matter if the user uses an Android or Apple cell phone.

SIM cards typically have sufficient memory to store up to 250 contacts, some of the user's text messages and other information that the carrier who originally supplied the card can make use of.

There are many nuances to SIM cards. Not all SIM cards are the same. Depending on what country the SIM card is purchased in, some SIM cards are locked to the carrier that the user originally purchased it from. This means that users are limited in using that particular SIM card only in cell phones sold by that carrier.

eSIMs— eSIM cards are specified in a relatively new standard that should make it easier to switch carriers, or to add a second line to an existing phone. As noted in some detail above, a SIM card is a "subscriber identity module" that is required in all GSM, LTE, and 5G devices. SIM cards are integrated circuits that contain a user's customer ID and details of how the user's phone can connect to its mobile network. SIMs initially were the approximate size of a postage stamp, but have been getting smaller over the years as device makers reclaim more space inside their devices for other electronics. In contrast to SIM cards, an eSIM takes the circuitry of a SIM, solders it directly to a device's board, and makes it remotely reprogrammable through software.

The original drive toward eSIMs came in part from the "Internet of Things" industry. Being tiny, and not requiring extra room for a slot, eSIMs are built directly into devices like drones, wearables, sensors, and location trackers, and of course, user equipment or cell phones where size is of the essence. They can also be soldered into industrial equipment where a SIM card may not be easily accessible. Being reprogrammable from a distance means eSIMs can be managed in bulk.

With smartphones, eSIMs provide both the user and the carrier much more flexibility in managing service plans as compared with that provided by SIM cards. A fully enabled eSIM device lets a user add a second plan, when the user is "roaming" or if the user desires to use a separate work line on the same single cell phone. eSIMs let users switch between network providers with the touch of a button. eSIMs also allow corporate device managers change the service plans of thousands of lines, remotely, at once. It's a powerfully pro-consumer feature if implemented correctly.

Simply put, eSIMs allows users to change a wireless carrier, data, or service plan via software. On eSIM devices, in general, one can proceed using a menu to take a photo of a QR code to change a carrier or service plan "on-the-fly". A user does not need to go to a store, wait for a physical SIM card to arrive in the mail, or manipulate or change a tiny SIM card integrated circuit. A user can also often use two different lines on the same user equipment, such as a home or work line, or switch between different plans depending on the user's location. All three of the major US carriers support eSIMs.

Activating User Equipment (e.g., Cell Phones) with eSIMS—

There are two common ways to program user equipment (UEs), such as a cell phone, using an eSIM. The simpler way is to pick a provider from an on-device menu, or through a downloadable application, and sign up for a plan using the application. The more complex way to program UEs using eSIMS (and the more common way when eSIMs are used on cell phones) involves using a carrier's website to generate a QR code, or having the carrier mail a user a piece of paper with a QR code printed thereon. The user then simply scans the QR code with a feature in the settings menu on the user's UE (phone). This is less convenient, but some carriers prefer it because it requires fewer changes to the carriers' systems. A QR-code-based system also works on more phones than an application ("app"), which may work only on one OS or phone model.

Management of User Equipment (UE) Credentials—

User Equipment (UE) credentials are managed by completely independent entities within wireless networks. MNO UE credentials are independent of Enterprise Network UE credentials. One possible implementation is to use "dual form" SIM type cards in a single UE. There are many implementations that support dual form SIM cards. Alternatively, or possibly additionally, a form factor can be implemented where there are two physical slots and two independent SIM slots provided on the UE. A single physical card supports two credentials. Another possible "SIM UE" implementation uses a type of UE form factor that includes a single physical SIM slot, and it also includes an "e-SIM". As described above in some detail, e-SIMs are electronic implementations or alternatives to physical SIM cards. e-SIMs are not implemented as physical cards. Rather e-SIMs are implemented in memory typically residing on a UE device.

As described below in much more detail, especially with reference to the Figures, the present methods and apparatus are directed toward techniques and mechanisms for reclaiming credentials previously provisioned for User Equipment (UEs), wherein the previously provisioned credentials are no longer usable by or desirable to the UEs or their users. The methods and apparatus for reclaiming previously provisioned credentials are mainly directed to UEs that use e-SIMs to provision the credentials on the UEs. Using the approaches and techniques of the prior art, once a selected SIM credential is "pushed" onto a UE device, the selected SIM credential lives (stays) on the UE device indefinitely and cannot be reclaimed or reused by the wireless network or by another UE. As described below in more detail with reference to FIGS. 3 and 6, the selected credential is also stored on an SM-DP+ platform network component 302 (FIG. 3) for SIM provisioning. Eventually, unless "reclaimed" by the network and deleted by the UE from its memory, the previously provisioned SIM or eSIM credentials disadvantageously and unnecessarily accumulate on both the network side and within the UE's memory. The present methods and apparatus for reclaiming previously provisioned credentials on UEs eliminates problems with the unnecessary accumulation of previously provisioned credentials.

FIG. 3 shows aspects of UE and network components 300 used in SIM provisioning. As shown in FIG. 3, an SM-DP+ platform network component for SIM provisioning 302, residing somewhere in the wireless network to which a UE 304 wishes to communicate with, interacts with the UE 304, and more specifically with an LPA platform 306 of the UE 304. A UE's (304) LPA platform 306 interacts with the network SM-DP+ platform 302 to obtain eSIM or SIM provisioning, thereafter allowing the UE 304 access to the wireless network. The SM-DP+ platform 302 therefore is essentially a SIM credential provisioning platform. The LPA platform 306 of the UE 304 interacts with the network's SM-DP+ platform 302 to retrieve a SIM credential and provisions the UE 304 with the selected SIM credential.

This form of SIM provisioning is referred to as "eSIM provisioning" of the UE device. As noted above, disadvantageously, in the prior art, once the UE 304 is "eSIM provisioned with a selected credential" and the UE 304 no longer wants to use or needs the selected eSIM credential, the selected SIM credential cannot be reused or reclaimed for use on or by another UE. This is due to the simple reason that the UE 304 does not explicitly delete the selected eSIM credential. There currently are no means for the UE deleting or discarding the provisioned eSIM credential. There currently are no means for explicitly cleaning this selected SIM credential from the UE device 304 and allowing the rest of the communication system (i.e., network) to reuse it. This also means that the eSIM credentials that are no longer used are left over and accumulate in the network database. The database unnecessarily accumulates no longer used, and undesirable previously-used provisioned SIM credentials. As a result, the database accumulates information that takes up space and cannot be easily removed, if at all. This situation results from the fact that because the eSIM credential was assigned to a UE at some moment in time, the eSIM credential must be maintained in the database indefinitely unless and until it is explicitly deleted.

Besides increasing the complexity of the network components and overhead associated with previously provisioned no longer used eSIM credentials, the unused credentials also increase costs associated with the wireless network. An increase in credentials maintained by the network database results in increases in costs of maintaining and providing wireless network services. For example, maintaining over 150,000 eSIM credentials costs the wireless network "x" amount of money to provide network services, maintaining over 200,000 eSIM credentials costs the wireless network "y" amount of money to provide the equivalent network services (where y>x), and so on.

An Exemplary Use Case—

Consider an exemplary simple use case. Assume that every week approximately 10,000 new guests attend a convention or event at the San Diego convention center. Further assume that an Enterprise Network is deployed at the San Diego convention center and that each attendee, or the majority of attendees desire access to the Enterprise Network and its services. Each and every time a new attendee attends a convention or event at the convention center, they are provided with a unique SIM or eSIM credential to gain access to the Enterprise Network and its services. The presently disclosed methods and apparatus for reclaiming eSIM credentials that are no longer desired or used by UEs allows the previously provisioned eSIM credentials to be repurposed. The goal is to release previously provisioned eSIM credentials from both the network server components and the user UEs. As noted briefly above, the eSIM credentials are stored in memory on the UE devices. The UEs can quickly run out of memory to support additional eSIM credentials if the older credentials are not released/removed from both the server and the UE memory. Theoretically, the eSIM credentials could be manually deleted from the UE devices by its users. However, users hardly ever, if never, explicitly delete their UE's eSIM credentials. This is analogous to the fact that Wi-Fi hotspots accumulate on users' laptops and typically are never explicitly deleted by their users.

It is useful and desirable for a subscriber credential to be assigned for a limited time when a potential first user enters a publicly available network deployed in a location such as a shopping mall, convention center, theme park or other publicly accessible venue. In such exemplary use cases, it would be useful for the first user carrying a UE to gain access for the time the first user is present at the location, and then to allow the credentials that were assigned to the first user to be reclaimed for use by another user when the first user leaves the location.

Another instance in which it would be useful to allow a subscriber credential to be used for a selected time period and then later reclaimed occurs, for example, when an employee is granted access to an Enterprise Network for the employee's length of employment. Upon the employee's termination of employment, the credentials previously provisioned and assigned to the employee's UE are then reclaimed and reassigned to another (possibly new) employee.

In some use cases, credentials are stored within a Subscriber Information Module (SIM) card. In some such cases, the SIM card can be removed from one UE and the credentials assigned to another UE in which the SIM card is installed. However, this is not possible in the case of a UE that has an embedded SIM. Furthermore, even in the case of SIM card that can be reinstalled in another UE, the only way to reclaim the credentials is to have the SIM card physically removed and reinstalled in the new UE. Therefore, a relatively large number of credentials may need to be supported on both UEs and on servers that track and authenticate access by UEs. Having such large numbers of active credentials increases the risk of unauthorized access to networks, unnecessary hosting costs on the server side, and use of memory that might at some point prevent other credentials from being downloaded and provisioned for use by a UE.

In some embodiments, deprecating of an installed credential on a UE allows the credential to be reclaimed by a provisioning system on the network side. It should be noted that independent of the particular method used to provision and install a credential on a UE, reclamation of the credential is still required. That is, whether the credential is provisioned and installed on a UE using: 1) a specific QR code; 2) a broadcast QR code; or 3) MDM methods, mechanisms are needed to release a previously provisioned and assigned credential from UEs.

As described in detail below and as shown in the Figures, the present methods and apparatus for reclaiming of previously provisioned SIM credentials on User Equipment provides the desirable credential provisioning properties set forth above and allows re-use and re-provisioning of previously provisioned SIM credentials for use with User Equipment (UEs).

BRIEF DESCRIPTION OF THE DRAWINGS

The disclosed methods and apparatus, in accordance with one or more various embodiments, are described with reference to the following figures. The drawings are provided for purposes of illustration only and merely depict examples of some embodiments of the disclosed methods and apparatus. These drawings are provided to facilitate the reader's understanding of the disclosed methods and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

The disclosed methods and apparatus provide mechanisms by which a subscriber credential that is provisioned and used to authorize a subscriber owned user equipment (UE) to gain access to a particular network can be assigned for a limited time period. In accordance with some embodiments, after the limited time period expires, the provisioned credential can be reassigned to another user and another UE. Some instances in which this is useful are when a visitor is granted temporary access to an enterprise network. An enterprise network is defined as a network in which only users that are members of the enterprise and their guests are typically allowed access to the resources of the network.

Figure 1:
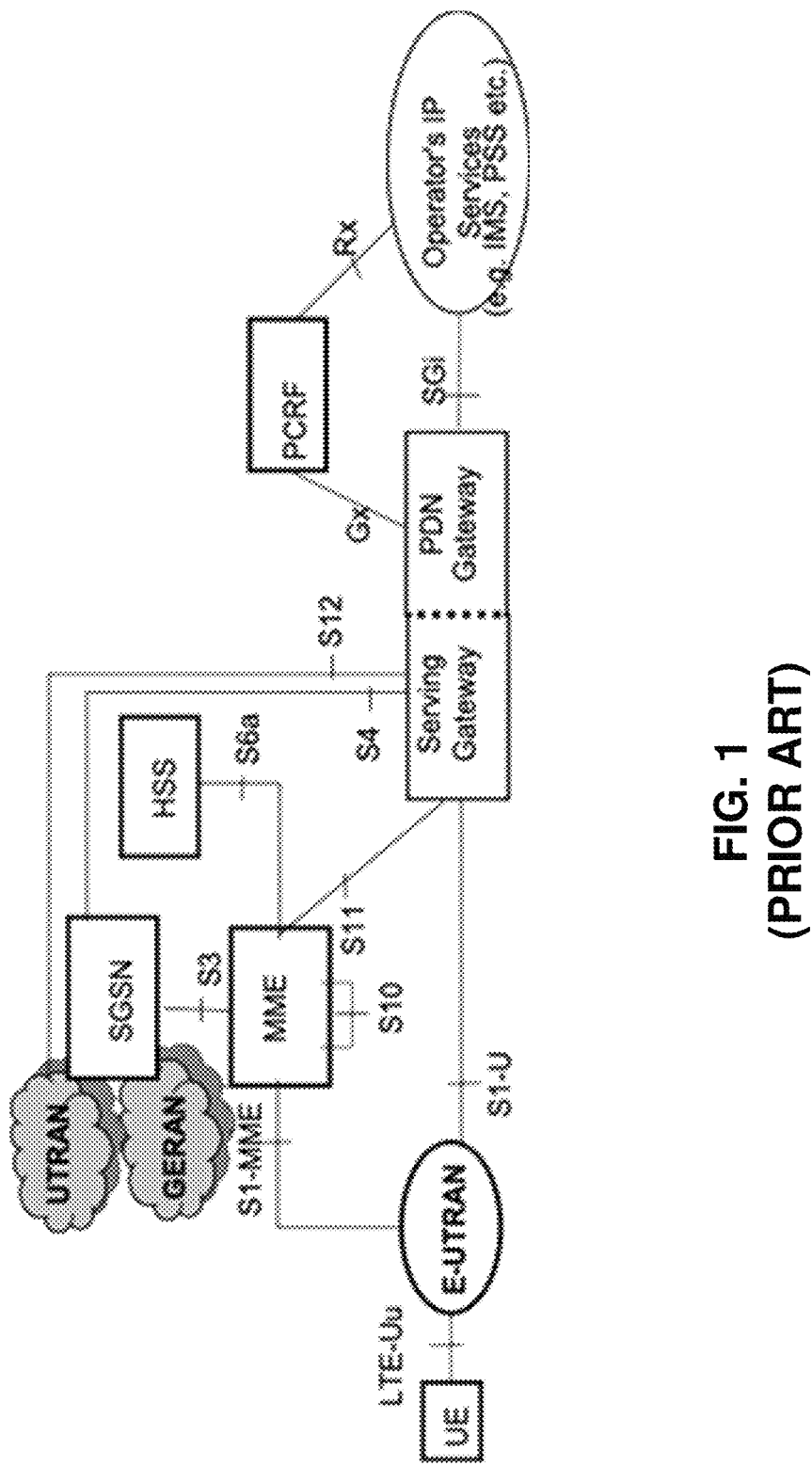
FIG. 1 is a simplified illustration of an EPC architecture of a 4G network.
Figure 2:
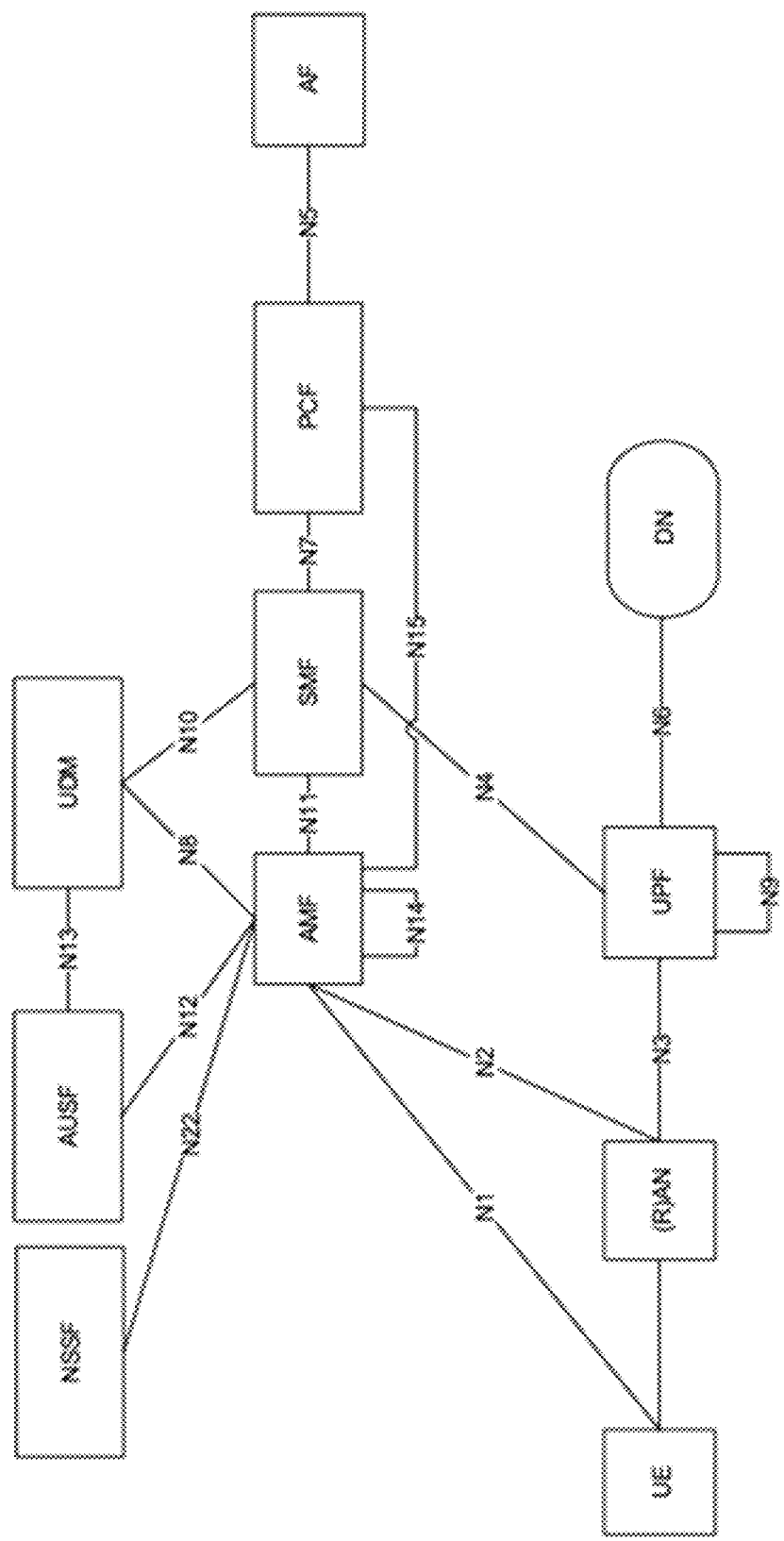
FIG. 2 is a simplified illustration of a 5GC architecture of a 5G network.
Figure 3:
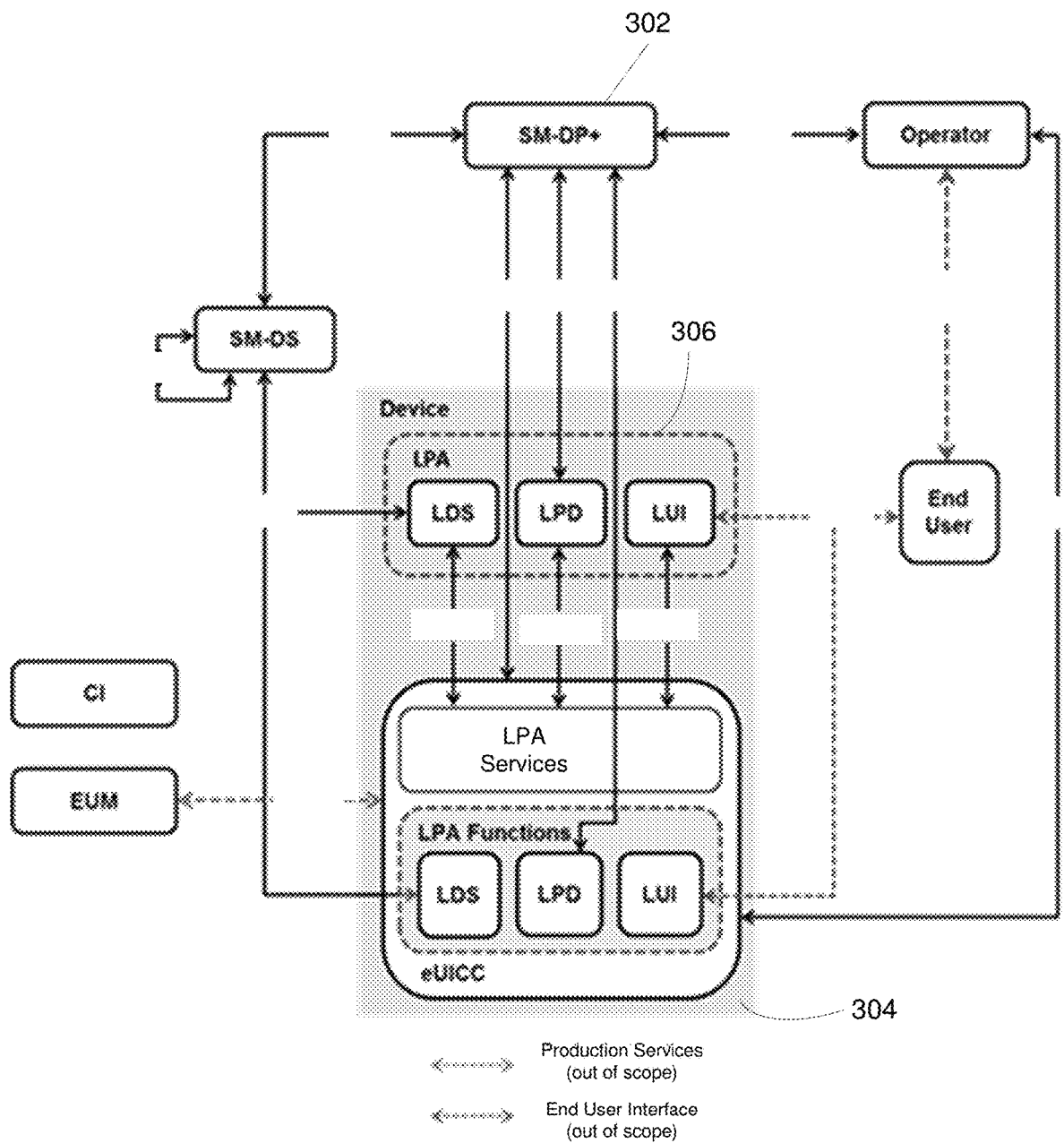
FIG. 3 illustrates a UE and network component for SIM provisioning.
Figure 4:
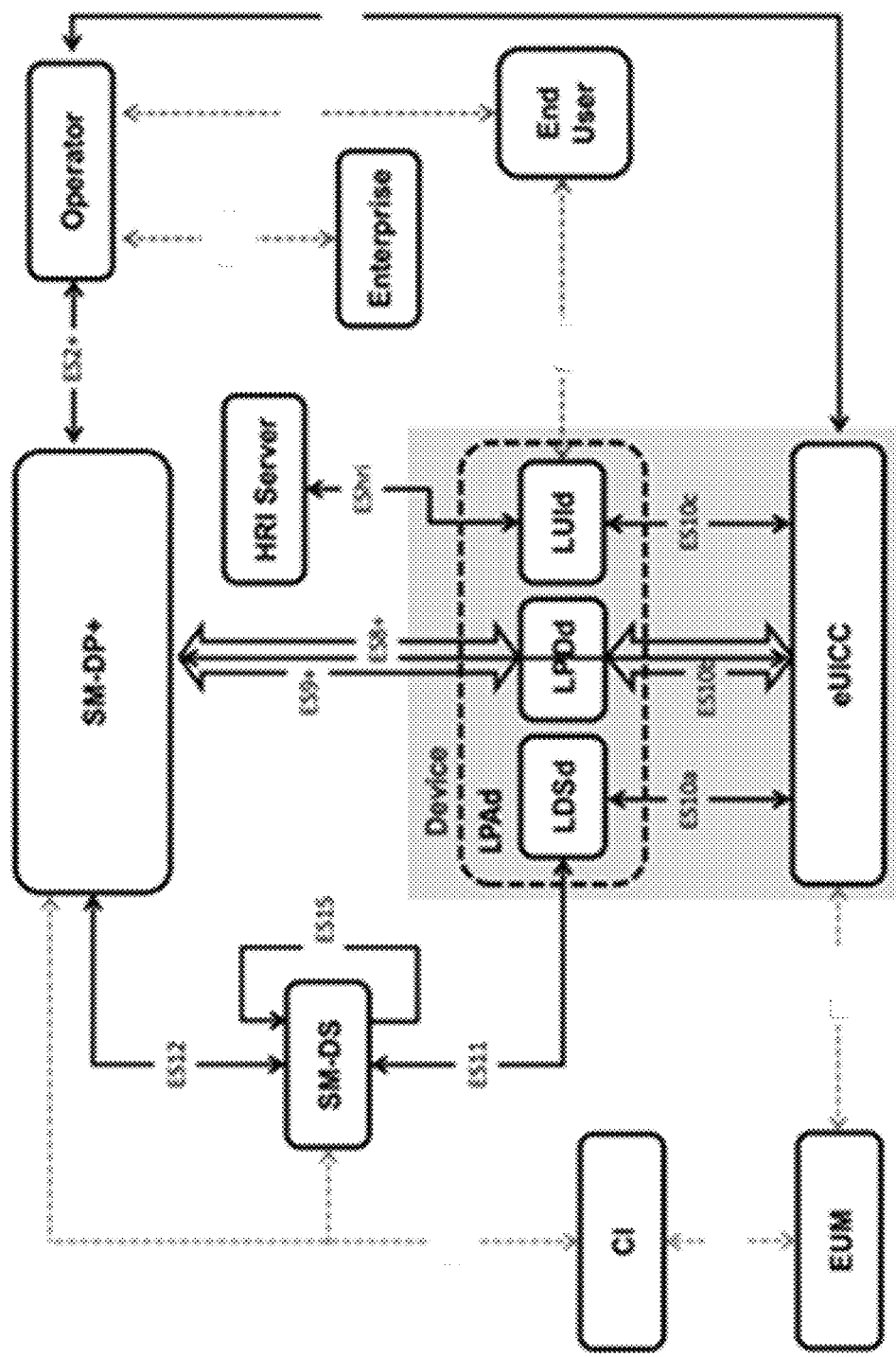
FIG. 4 illustrates remote SIM provisioning for a consumer architecture.
Figure 5:
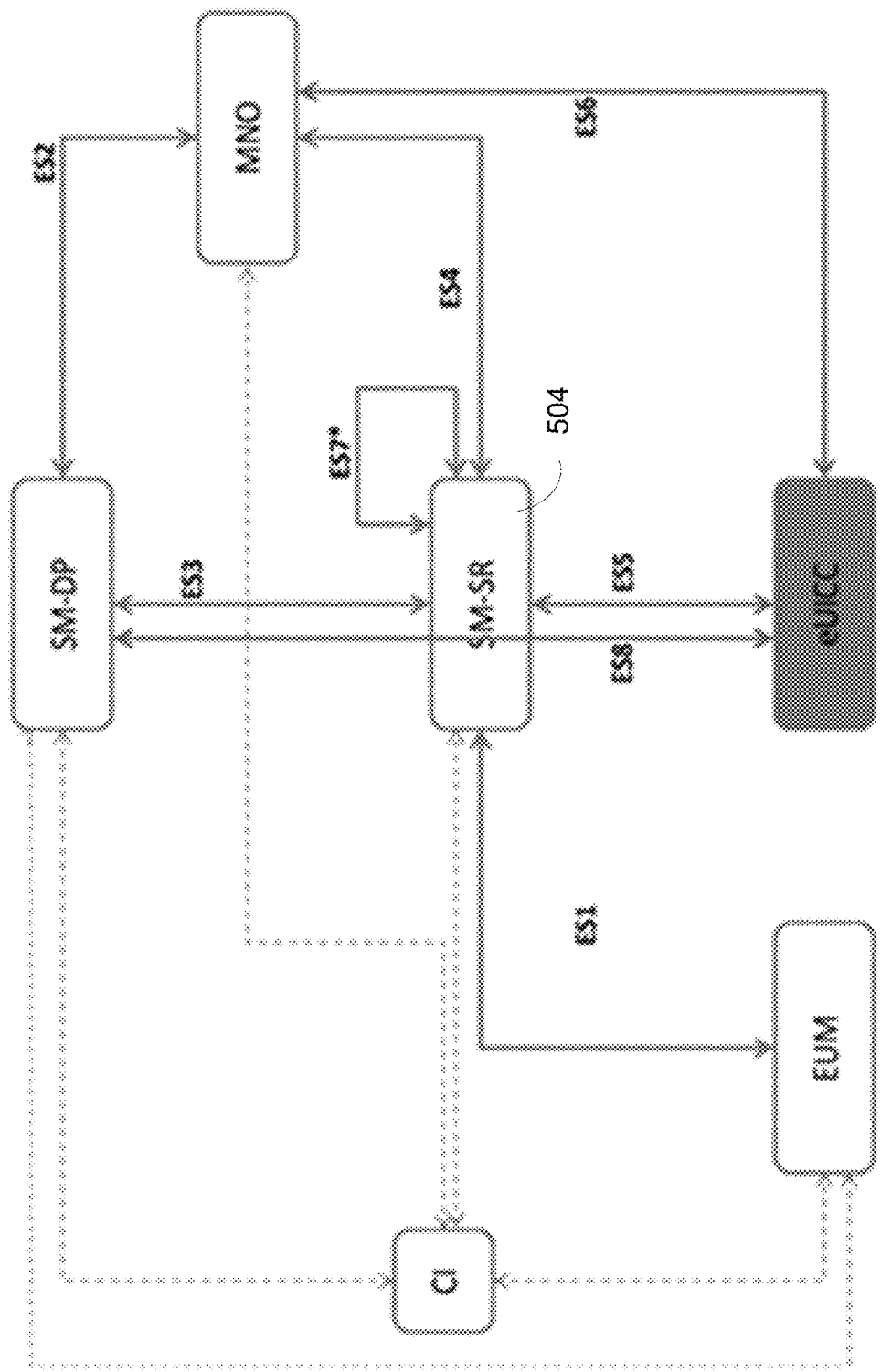
FIG. 5 illustrates an M2M/IoT model for SIM provisioning.

FIG. 1 is a simplified illustration of an EPC architecture of a 4G network. FIG. 2 is simplified illustration of the architecture of a 5GC architecture of a 5G network. FIG. 3 illustrates a UE and network component for SIM provisioning. FIG. 4 illustrates remote SIM provisioning for a consumer architecture. FIG. 5 illustrates a Machine-to-Machine/Internet of Things (M2M/IoT) model for SIM provisioning.

Figure 6:
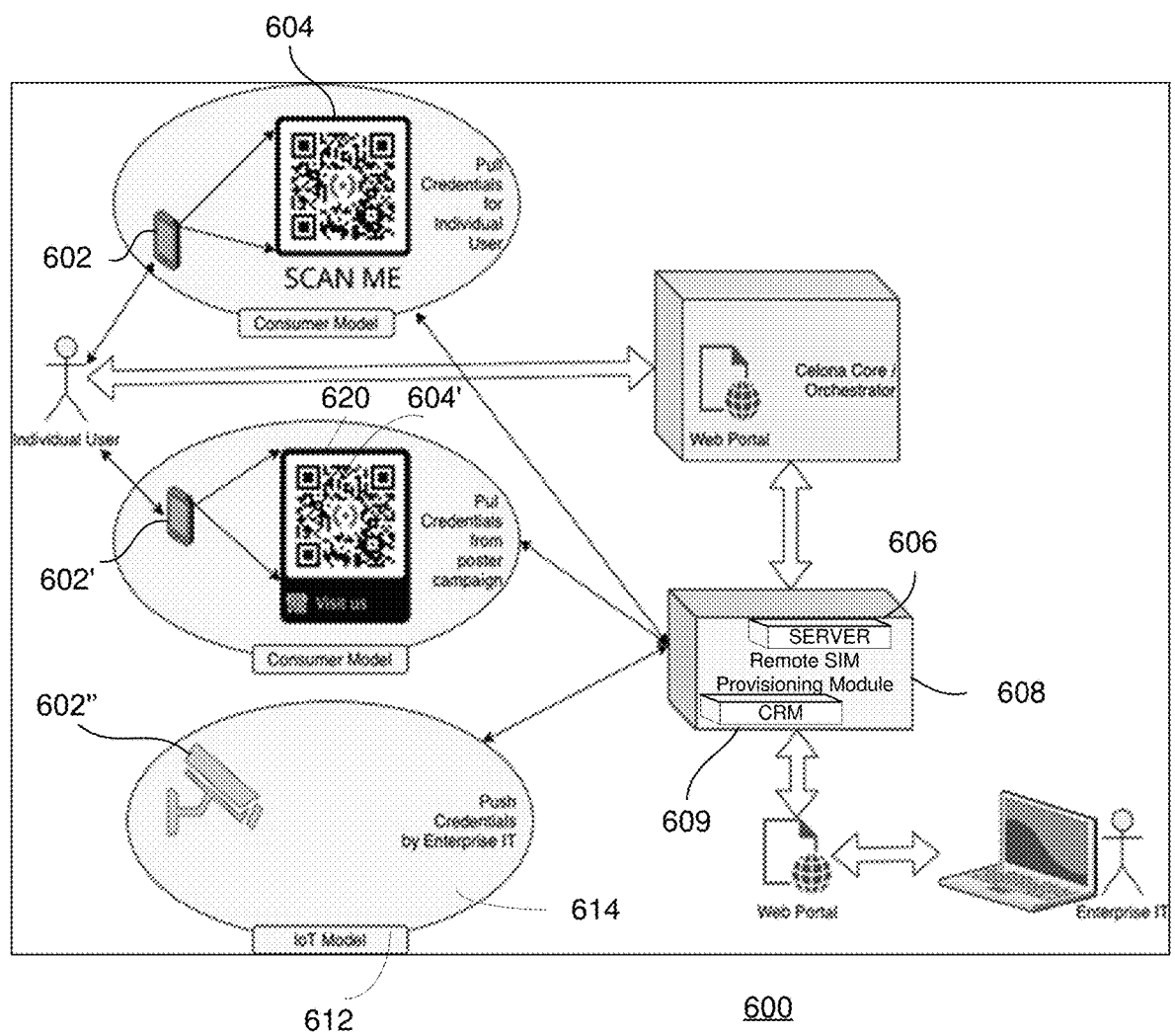
FIG. 6 illustrates SIM provisioning methodologies.

FIG. 6 illustrates eSIM provisioning methodologies 600. Devices (such as a UE 602, 602') receive the eSIM credentials through either a "pull" or a "push" model. For the pull model, the typical approach is to use a method that is based on a Quick Response (QR) code. In one instance, a unique QR code 604 can be used. Alternatively, a generic QR code 604' can be used. In either case, the QR code 604, 604' points to a SIM provisioning server 606 within a Remote SIM provisioning module 608. When a unique QR code 604 is used, the code 604 points to a specific eSIM credential. When the UE 602 scans the QR code 604, the UE 602 is pointed to the SIM provisioning server 606 to receive the assigned eSIM credential. Once assigned, this eSIM credential cannot be assigned to another user's UE. For generic QR codes 604', as are typically used in conferences and stadiums, a user scans the generic QR code 604', and the UE 602' starts communicating with the SIM provisioning server 606. As part of this communication, the SIM provisioning server 606 assigns a unique eSIM credential to the UE 602' and sends the eSIM credential to the user for acceptance.

The push model can be implemented with a Mobile Device Management (MDM) component or using a GSMA IoT model 612. When using the MDM component, the process is customized for each device vendor (e.g., Apple, Samsung, etc.) and requires explicit modules to be supported on and by the UE 602" and the network side. The network equipment is typically hosted on Enterprise Network IT servers. The IoT model 612 (also shown in FIG. 6 as "Push Credentials by Enterprise IT" 614) is used to provision credentials on "headless" UEs (devices) 602". As shown in FIG. 5, communications are performed via a device vendor specific Subscription Management Secure Routine (SM-SR) platform 504 for secure connection through which the required credentials are "pushed" to the IoT device 602" (FIG. 6).

Referring again to FIG. 6, the eSIM provisioning methods are now described in more detail. Using a "scan" method, in some embodiments a user is given a unique "QR" code 604, via a "SCAN ME" consumer model (as shown in the upper left-hand corner of FIG. 6). The unique QR code 604 can be provided to the user via a piece of paper or via email, or via some other form of communication. The user picks up his or her User Equipment (UE) 602 for example, which in this example is a cell phone, and scans the unique QR code 604 into the UE 602. This essentially connects a user's UE 602 with the "Remote SIM Provisioning Module" 608, which "pushes" the eSIM credential back to the UE 602 (or, expressed differently, the UE 602 "pulls" the provisioned SIM credential from the Remote SIM provisioning Module 608).

As described hereinbelow, eSIM provisioning methods and apparatus can, in some embodiments, take four forms or "models": (1) an explicit consumer credential model (where there is one explicit SIM credential given to a user based on the QR code); (2) a consumer "broadcast" credential model; (3) an IoT credential model; and (4) an MDM ("Mobile Device Management") model. Each of these SIM credential provisioning models are described in more detail now.

In accordance with the (1) explicit consumer credential model, typically, the one explicit SIM credential comprises a very long identification code (ID) that is given to the user's UE 602 based on the unique QR code 604 and is associated with the unique QR code 604. The single explicit eSIM credential is available only to that particular user.

In accordance with the (2) consumer "broadcast" credential model, in one exemplary embodiment, there may be a poster placed at the entrance of a convention center or Enterprise Network as shown in FIG. 6 as a poster 620. The poster 620 displays a generic QR code 604'. In accordance with some embodiments of the broadcast credential model, convention attendees or Enterprise Network users use cameras in their UEs 602 and scan the generic QR code 604' displayed by the poster 620. The generic QR code 604' "points" to the Remote SIM Provisioning platform 608 where the UE 602' can proceed to retrieve its SIM credential from the Remote SIM Provisioning platform 608. When this occurs the Remote SIM Provisioning platform 608 creates a unique new SIM credential and sends it to the UE 602' (the UE 602' is said to "pull" the new SIM credential from the Remote SIM Provisioning platform 608). It is a "pre-made" SIM credential and the pre-made SIM credential is unique to the UE 602' and is assigned to that particular UE 602'.

Essentially there are two identifiers associated with SIM or eSIM credential provisioning. A first identifier is called an Embedded Identify Document ("EID"), and the second identifier is called an "ICCID", which is a SIM identifier/credential. The EID and the ICCID are "paired" (i.e., they are "tied together") in the Remote SIM provisioning platform 608 "domain". As noted, the EID (which is a SIM provisioning platform identifier in the UE 602) and the ICCID (which is a SIM identifier/credential), are tied together. Once they are tied together, they cannot be torn apart or separated from each other. Once made, the tie between the EID and ICCID identifiers cannot be broken.

Referring again to FIG. 6, and as briefly noted above, a third model for provisioning SIM credentials to UEs comprises a (3) IoT credential model 612. The IoT credential model 612 is used to provision SIM credentials for use by "headless" UEs 602" thereby allowing the headless UEs 602" access to the various Enterprise Network services. The (4) MDM platform model is described in detail below with reference to the Figures. Note that all UE SIM credentials are managed by the Enterprise Networks that the UEs are provisioned for use thereon.

Several methods and apparatus are now described (and set forth in the appended claims) for provisioning UEs with SIM credentials, and importantly, for reclaiming previously provisioned SIM credentials for re-use and repurposing. Although four (4) different approaches/techniques for provisioning UEs with SIM credentials and reclaiming of provisioned credentials are described below, the present methods and apparatus are not limited to the four specific approaches identified and described below. Rather, the scope of the presently disclosed methods and apparatus for provisioning UEs with SIM credentials and reclaiming previously provisioned credentials for re-use are limited only by the claims. Note that the first three approaches use GSMA standards methodology-based approaches. The fourth approach described in detail below (the MDM platform methodology-based approach) is not a GSMA standards methodology-based approach.

Note that FIGS. 7, 8A, 8B, and 9-13 (inclusive) show details of specific messaging that takes place between various network components in some embodiments of the present methods and apparatus for eSIM credential provisioning and reclaiming. More specifically, these figures show details of specific messaging that takes place between various network components when managing and reclaiming provisioned UE credentials in accordance with the present teachings. For example, FIG. 7 (described below in more detail) shows details of the messaging that takes place (in a "validity timer-based" approach) between a UE 702, an Enterprise Local Credential Database (ELCD) 740, an Enterprise Global Credential Database (EGCD) 742, a Celona (or proprietary) Global Credential Database (CGCD) 744 and a SIM credential Provisioning Platform (SPP) 706. The ELCD, EGCD, CGCD and SPP components are Enterprise management components used in implementing the present methods and apparatus allowing subscription credentials provisioned to UEs to be released for reuse and repurposing.

Figure 7:
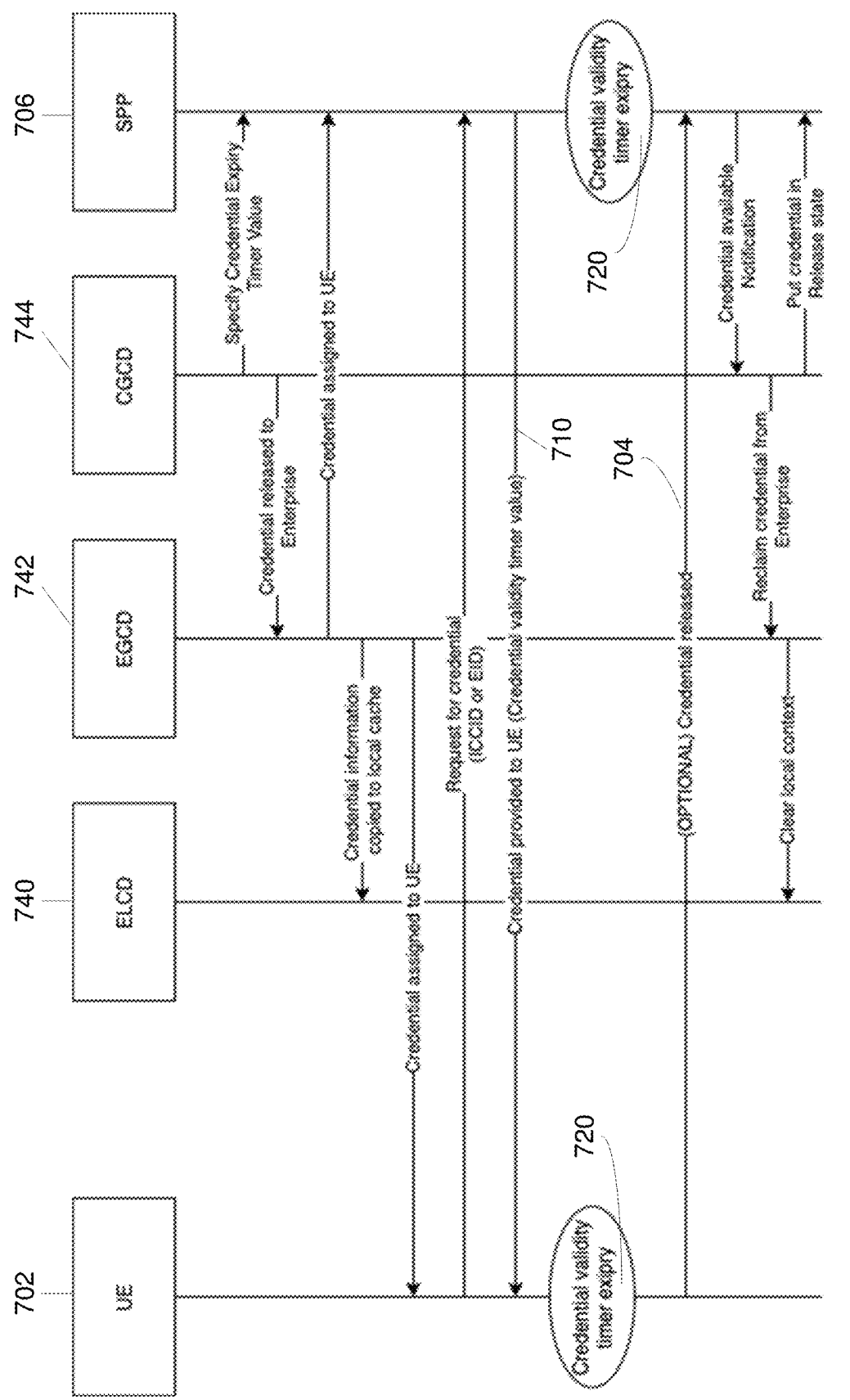
FIG. 7 illustrates a credential validity timer-based approach to provisioning UEs with SIM credentials and reclaiming of provisioned credentials in accordance with the disclosed methods and apparatus.

Validity Timer-Based Approach to Provisioning UEs with SIM Credentials and Reclaiming of Provisioned Credentials FIG. 7 illustrates a credential validity timer-based approach 700 in accordance with the disclosed methods and apparatus. In some embodiments, while installing and provisioning a credential on a UE 702, a credential validity timer value determines when the UE 702 will implicitly delete a provisioned credential from the UE 702. In accordance with this method and apparatus, a credential validity timer is associated with a SIM credential. When the SIM credential Provisioning Platform (SPP) 706 provides the SIM credential to a UE 702, it also associates this with a "credential validity timer". The credential validity timer eventually expires. When the credential validity timer expires, the SIM credential previously provisioned and assigned to the UE 702 is deleted from both the UE 702 and on the server side. This means "clearing" the context so that the previously provisioned SIM credential can be re-used or re-purposed by another (or even the same) user at some time afterwards.

Describing this validity timer-based approach in more detail, and referring again to FIG. 7, in some embodiments, the SPP 706 provides, via messaging 710, a credential to the UE 702 together with the credential validity timer value (see the message 710 of FIG. 7). In some embodiments, when the credential validity time expires 720, deletion of the credential by the UE 702 is followed by an explicit confirmation message 704 of deletion by the UE 702 to the network, and more specifically, to confirm the deletion of the credential by the UE 702 to the SIM Provisioning Platform SPP 706 (i.e., to the SM-DP+ 302 shown in FIG. 3).

In some embodiments, the explicit confirmation message 704 sent from the UE 702 to the SPP 706 is considered optional, and the provisioning system implicitly assumes that the credential is available for reuse after the allocated time period (that is, after the credential validity timer has expired 720). In some embodiments, the remote SIM provisioning module 608 (FIG. 6) maintains one or more credential validity timers (not shown) within the network and monitors each credential validity timer to determine when each timer has expired. Each such credential validity timer is associated with a predetermined credential assigned to a UE 702. As long as the credential remains "active", the UE to which the credential is assigned may access network resources.

A credential release module (CRM) 609 (FIG. 6) within the Remote SIM Provisioning Module 608 (FIG. 6) is configured to release a predetermined credential associated with its credential validity timer upon expiry of the credential validity timer 720. Once released, the credential is deleted from the list of active credentials maintained by the CRM 609 (FIG. 6). Accordingly, the UE to which the credential was previously provisioned and assigned will no longer have access to the network.

In some cases, the remote SIM provisioning module 608 returns a released credential back into a pool of available credentials. Credentials within this pool can be assigned to UEs that apply for a subscriber credential in order to gain access to the network. In the case of an enterprise network, a pool of credentials that are assigned to the enterprise network allow UEs that are subscribers/members of the network to gain access once the credential is associated with the UE and an appropriate validation procedure is performed between the enterprise network and the UE. In one embodiment of the disclosed methods and apparatus operating in such cases, once released, a subscriber credential is returned to the enterprise network credentials pool for reassignment to other UEs owned/operated by members of the enterprise network, or to those to whom access to the enterprise network is to be granted. Similarly, a selected wireless network (a wireless network that is not an Enterprise Network) may maintain a pool of credentials that are associated with the selected wireless network, and the credentials may be assigned by the selected wireless network to a UE, thereby allowing the UE to gain access to the selected wireless network.

Figure 8A:
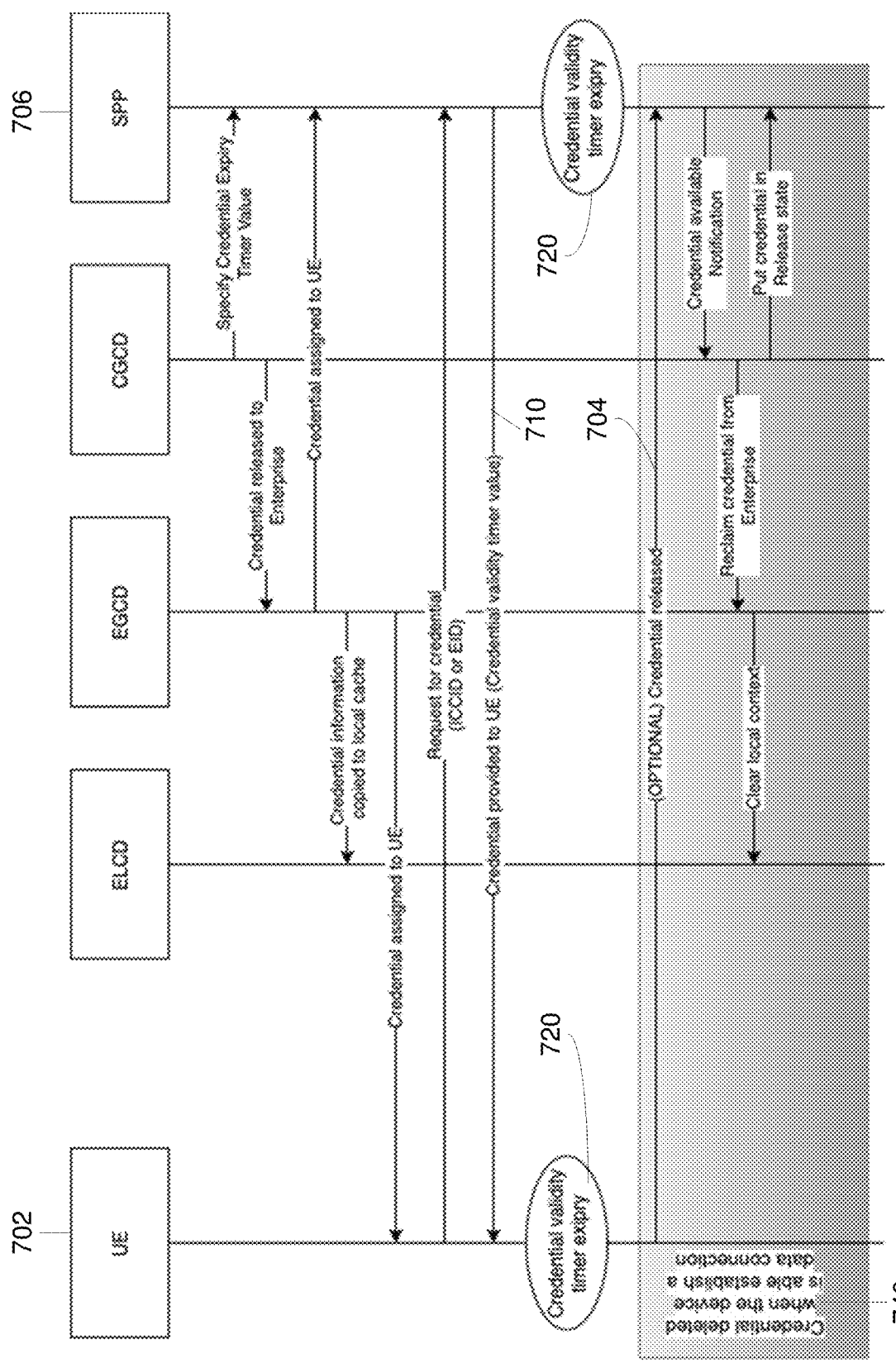
FIG. 8A illustrates a credential validity timer-based approach wherein a UE may not be connected to the network managing the release of the SIM credential.

FIG. 8A illustrates a credential validity timer-based method 800 wherein the UE 702 may not be connected to the network that manages and controls the release of the previously provisioned SIM credential. In some embodiments, when this is the case, the credential is deleted only after the UE device 702 is able to establish a data connection to the network, and thus is able to provide a confirmation that the credential has been released (for example, via the message 704 as shown in FIG. 8A).

Extending Credential Lifetime with SPP

Figure 8B:
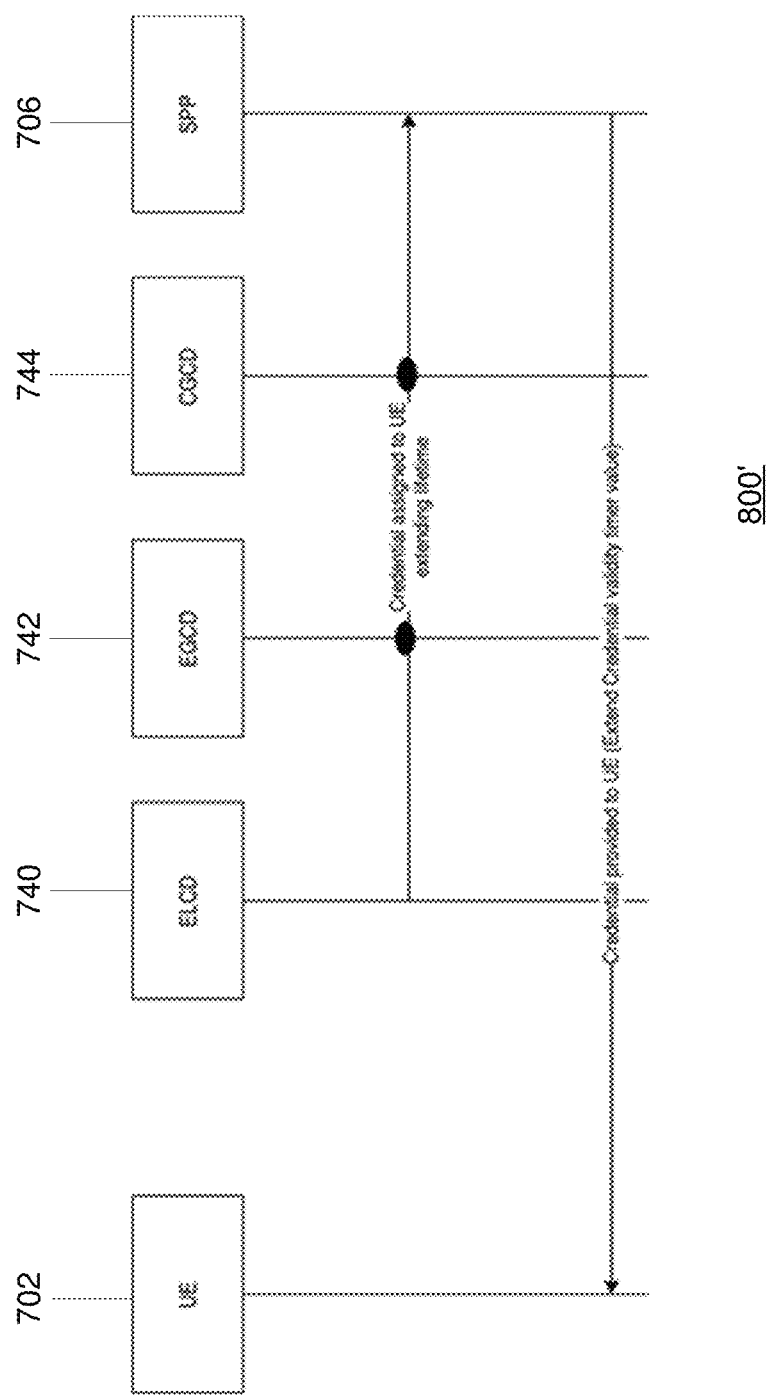
FIG. 8B illustrates the information exchange between the SPP and the UE when extending the lifetime of a previously provisioned subscriber credential.

In accordance with some embodiments, the SIM provisioning platform 706 associated with the enterprise network is capable of extending the lifetime of a previously provisioned subscriber credential. In some embodiments, the UE 702 receives a communication from the SPP 706 to extend the SIM credential lifetime by a predetermined time period. More specifically, and referring to both FIGS. 3 and 7 simultaneously, the UE 304 (in FIG. 3, 702 in FIG. 7) is informed by the SPP 706 and receives a communication via the SM-DP+ 302 (FIG. 3) to extend the lifetime of the SIM credential that was previously provisioned and assigned to the UE. FIG. 8B illustrates the messaging exchange 800' between the SPP 706 and the UE 702 when extending the lifetime of a previously provisioned subscriber credential.

More specifically, FIG. 8B shows messaging between the UE 702, and the network components ELCD 740, EGCD 742, CGCD 744, and SPP 706 when extending the lifetime of a previously provisioned subscriber credential of the UE 702.

Figure 9:
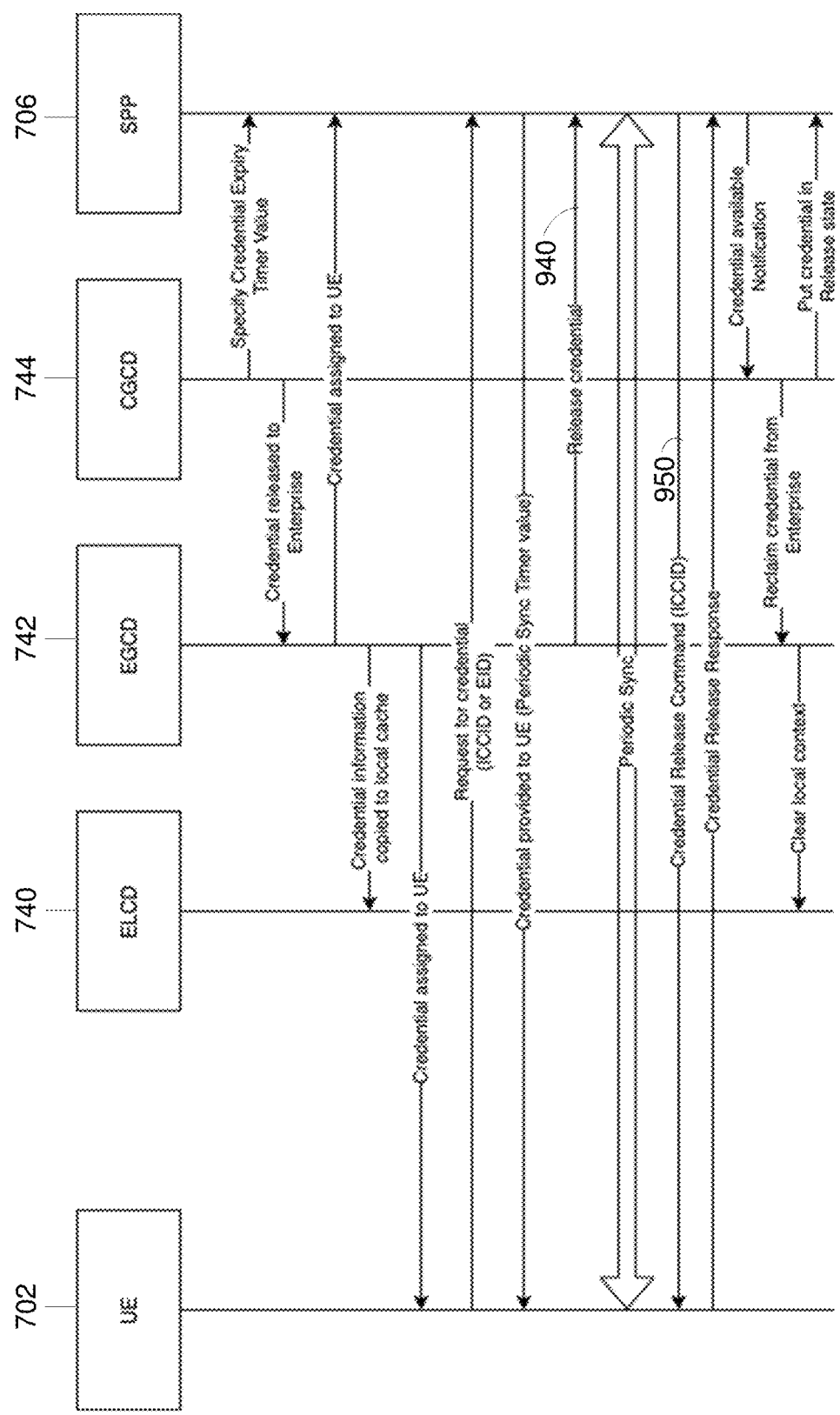
FIG. 9 illustrates a release command-based method of provisioning UEs with SIM credentials and reclaiming of provisioned credentials. In this embodiment, an explicit request is sent to the UE to force a release of the installed credential.

Release Command-Based Approach to Provisioning UEs with SIM Credentials and Reclaiming of Provisioned Credentials FIG. 9 illustrates a release command-based method 900 of provisioning UEs with SIM credentials and reclaiming of previously provisioned credentials. In this embodiment, an explicit request is sent to the UE 702 to force a release of the installed credential. The network initiates the credential release command, demanding the release of the SIM credential from the UE 702.

This requires the UE 702 to be online and reachable by the component that is responsible for sending the command. The Embedded Identify Document (EID) is the one common identifier that applies across all credentials. The EID is a built-in SIM card identifier in the phone (UE) that allows a user to use the services of a mobile operator without the need for an external SIM card. In some cases, the UE 702 may not be connected through the network associated with the credential that needs to be released. In some cases, the UE 702 may be connected through network that is a non-3GPP network, such as Wi-Fi. Therefore, in some embodiments, a mechanism is provided to communicate with the UE 702.

In some embodiments, independent of the method used by a UE for connectivity, periodic polling (i.e., periodic sync) of the UE is performed by the provisioning platform associated with the credential to be released. Such polling is typically used to provide updates to the provisioned SIM credential. In some such embodiments, upon determining that it is appropriate to release the credential, when the UE makes contact with the SIM provisioning platform 706, the network initiates a release of the credential from the UE 702.

In accordance with the described release command-based method 900, SIM credentials are essentially "pulled away" from the User Equipment (UE) devices. This is required, for example, when a user leaves employment of a company and no longer is allowed access to an Enterprise Network operating on the company's premises. In such an exemplary use, the credential for that person's UE must be pulled away from the UE so that it may be reused. This release of a subscriber credential is performed within the Enterprise Network (EN) and by its EN components, and is then communicated to the EGCD 742 and the CGCD 744. The EGCD 742 then communicates the release of the SIM credential to the SPP 706 by sending a "release credential" message 940 to the SPP 706. The SPP 706 then demands that the UE 702 releases the previously provisioned eSIM credential by transmitting a "Credential Release Command (ICCID)" message 950 to the UE 702. The released SIM credential can then be reused for further use by another user and another UE.

So, in sum, the released command-based process is initiated by the local Enterprise Network and the sequence is triggered by an Enterprise ID. The Enterprise Network decides that a UE no longer requires use of its SIM credential, and it then pushes this information to the EGCD 742 and the CGCD 744. The EGCD 742 determines that user has left the company (Enterprise), and a message 940 is transmitted to the SPP 706 to release the previously provisioned eSIM credential. The SPP 706 then transmits the Credential Release Command (ICCID) message 950 to the UE 702 which causes the UE 702 to delete the previously provisioned eSIM credential from its memory. Therefore, once the local Enterprise Network determines that a credential should be released, the EN initiates the release command-based process, and the rest of the sequence is simply message flows between network components and the UEs as shown in detail in FIG. 9.

Figure 10:
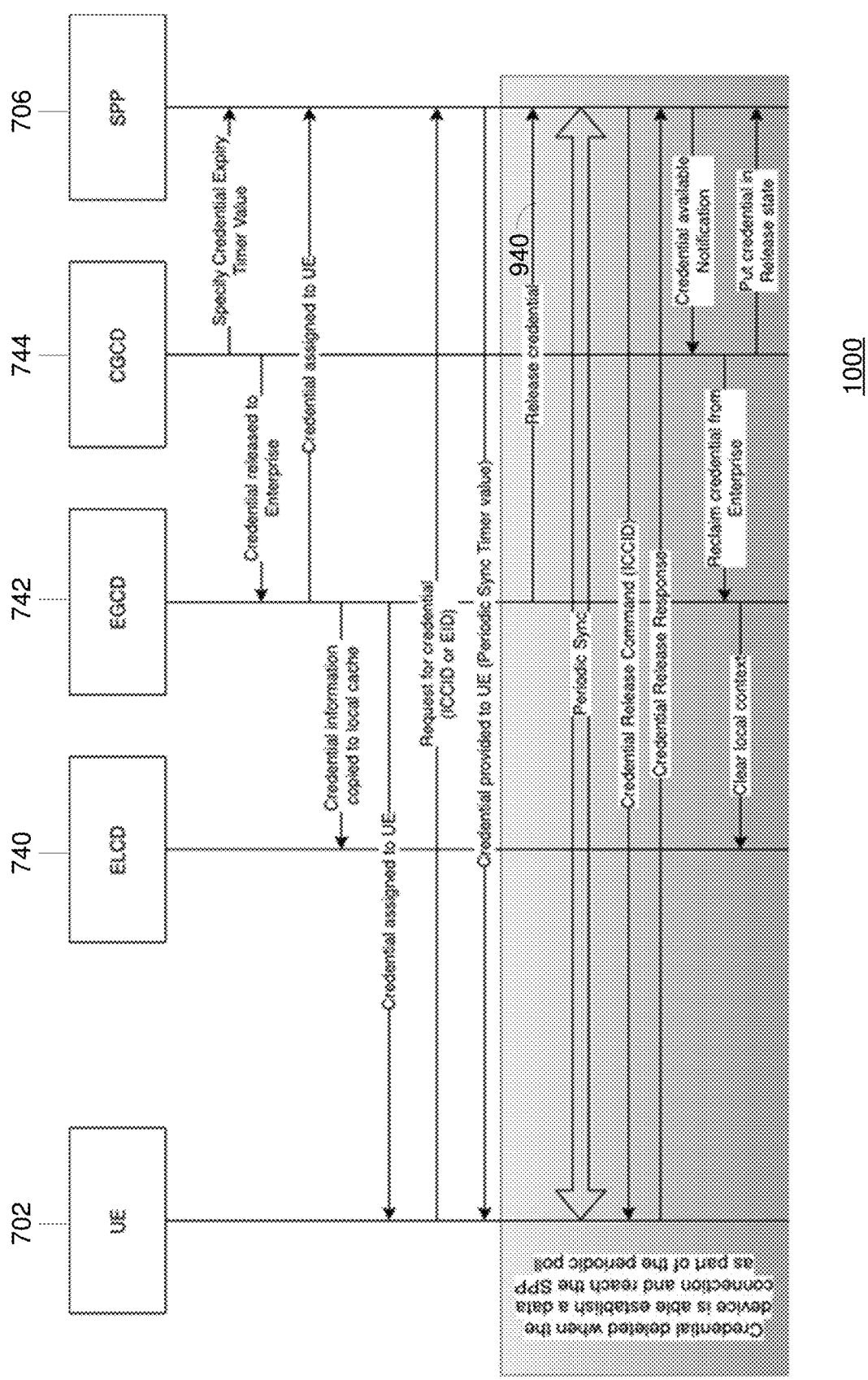
FIG. 10 illustrates an embodiment in which the credential to be released is the only credential within the UE available to allow data connectivity for the UE.

FIG. 10 illustrates an embodiment in which the only credential that allows for data connectivity between the UE and network components is the very credential that needs to be released. In such embodiments, the UE connection is retained in order to allow the release procedures to be executed prior to forcing the UE offline (i.e., prior to removing the credential from service). However, all subsequent connections are prevented since the credential will no longer be available after the command is executed on the UE.

User-Initiated Release of Previously Provisioned SIM Credentials

Figure 11:
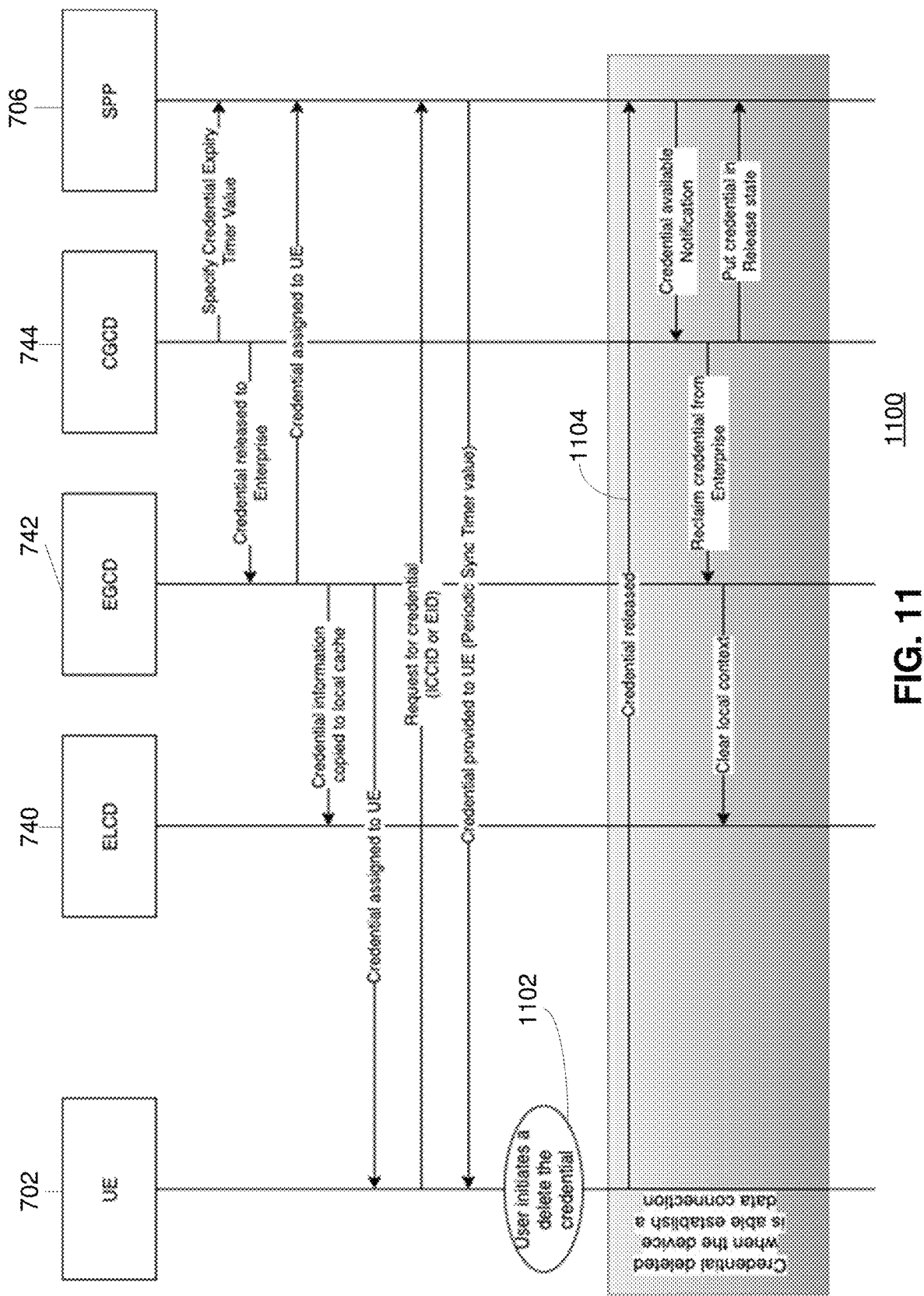
FIG. 11 is an illustration of an embodiment in which the user initiates a deletion of a credential.

FIG. 11 is an illustration of an embodiment in which the user initiates a deletion of an eSIM credential. Rather than the credential being deleted only locally, which does not release the credential in the network making it possible to be reused or repurposed, the user initiates a method by which the network also releases the credential for reassignment. In some embodiments, once the user has deleted the credential, the credential is marked on the UE to be released. When the UE subsequently has a data connection, it initiates a connection with the SPP to release the credentials. Once it is released, the context is cleared with the Enterprise Network and CGCD's 744 context is updated accordingly.

FIG. 11 shows the sequence of messaging that occurs when a user initiates a deletion of the SIM credential 1102. The user-initiated release 1102 deletes the previously provisioned SIM credential from both the UE 702 and the network. A message 1104 is transmitted from the UE 702 to the SPP 706 indicating release of the credential by the UE 702 and allows the wireless network to delete the credential as a currently used credential. More specifically, the deleted UE credential, responsive to the credential deletion initiation 1102 by the UE, is released by the CGCD 744. It is then removed from the Enterprise Global Credential Database (EGCD) 742, and it is removed from the Enterprise Local Credential Database (ELCD) 740 so the user (and SIM credential) does not continue to get authenticated.

Mobile Device Management (MDM) Methodology-Based Approach

Figure 12:
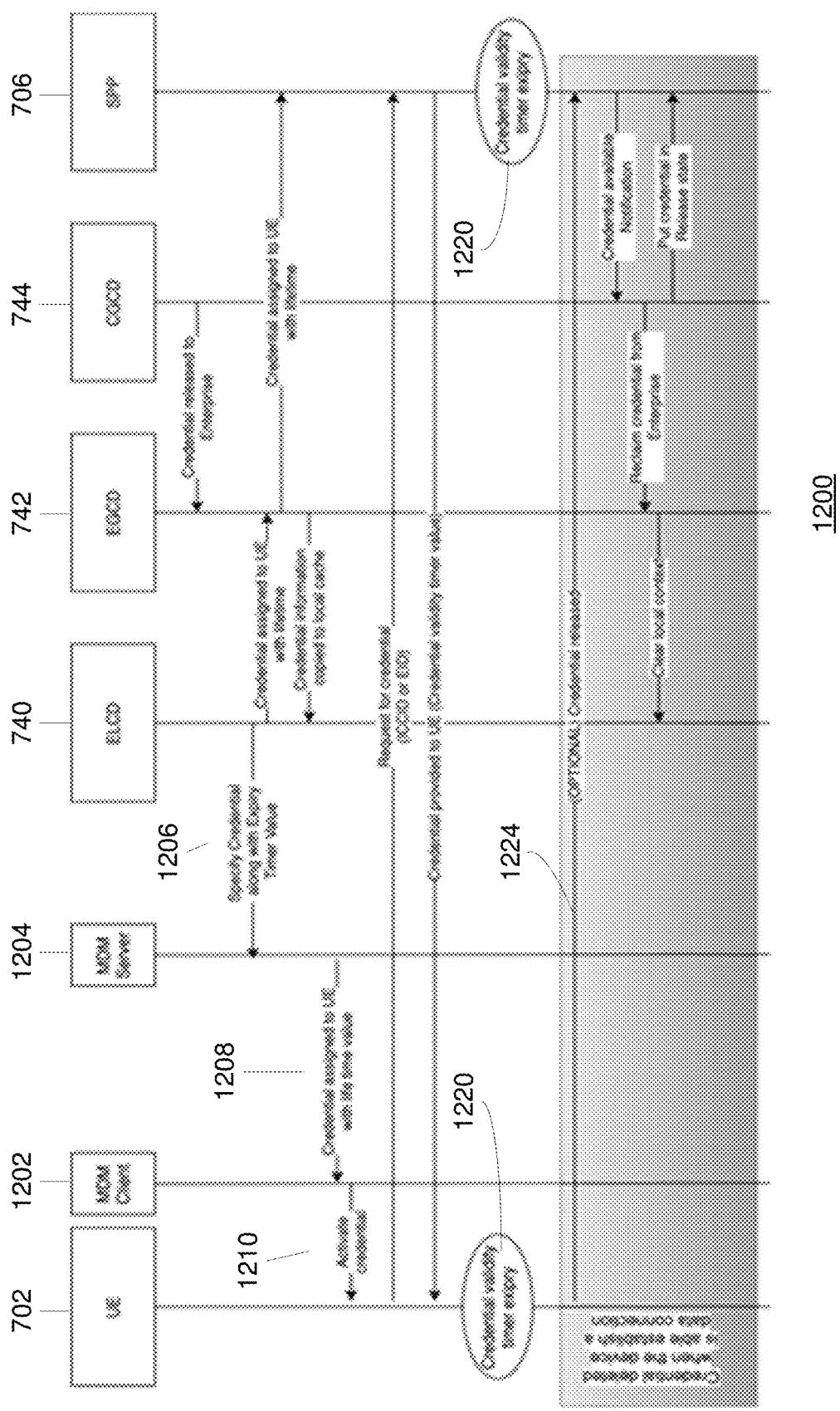
FIG. 12 is an illustration of an embodiment in which an MDM client in a UE releases an eSIM credential after a timer expires interacting with an LPP/eUICC platform on the UE.

FIG. 12 is an illustration of a Mobile Device Management (MDM) methodology-based approach 1200 to credential provisioning and reclaiming in which an MDM client in a UE 702 releases an eSIM credential after a timer expires. In the Validity Timer-based approach to provisioning UEs with eSIM credentials and reclaiming of Provisioned Credentials described above, a validity timer value is provided together with the eSIM credential itself. In accordance with the present MDM methodology-based approach 1200, a timer value is NOT provided together with the provisioned SIM credential. Rather, in accordance with the MDM methodology-based approach, a lifetime timer value associated with the provisioned eSIM credential is provided in MDM messages between the MDM client 1202 (implemented in some embodiments in the UE 702) and an MDM server 1204 (residing in the Enterprise Network).

In accordance with this approach, a lifetime timer value associated with an eSIM credential installed on the UE 702 is communicated via the MDM entitlement policies information. The MDM client in the UE shall release the eSIM credential after the timer expires interacting with an LPP/eUICC platform on the UE.

For example, as shown in FIG. 12, an expiry timer value is associated with a specified eSIM credential, and both are communicated in a message 1206 that is transmitted from the ELCD 740 to the MDM server 1204. The credential assigned to the UE 702 and the lifetime (or "expiry") timer value of the credential is communicated in MDM messages (such as in an MDM message 1208) between the MDM server 1204 and the MDM client 1202. As noted above, the MDM client resides within the UE 702. The MDM client 1202 activates the credential within the UE 702 via an MDM message 1210.

The MDM client in the UE shall release the eSIM credential after the lifetime timer value expires 1220 interacting with an LPP eUICC platform on the UE 702. The MDM server 1204 platform is a localized platform that can be used by an Enterprise Network locally. The Enterprise Network can very well use the MDM server 1204 platform, and modify it to the EN's needs. The EN can also use it to force a release of the eSIM credential automatically on the UE 702 using the MDM platform. This is shown, for example, in FIG. 12 as a message 1224 from the UE 702 to the SPP 706 indicating release of the credential. As noted hereinabove, this MDM methodology-based approach is the only approach described herein that is not based on GSMA standards-based methodologies. Rather, the present MDM methodology-based approach comprises an Enterprise Network proprietary approach using the MDM platform to release, reclaim and reuse previously provisioned eSIM credentials.

Figure 13:
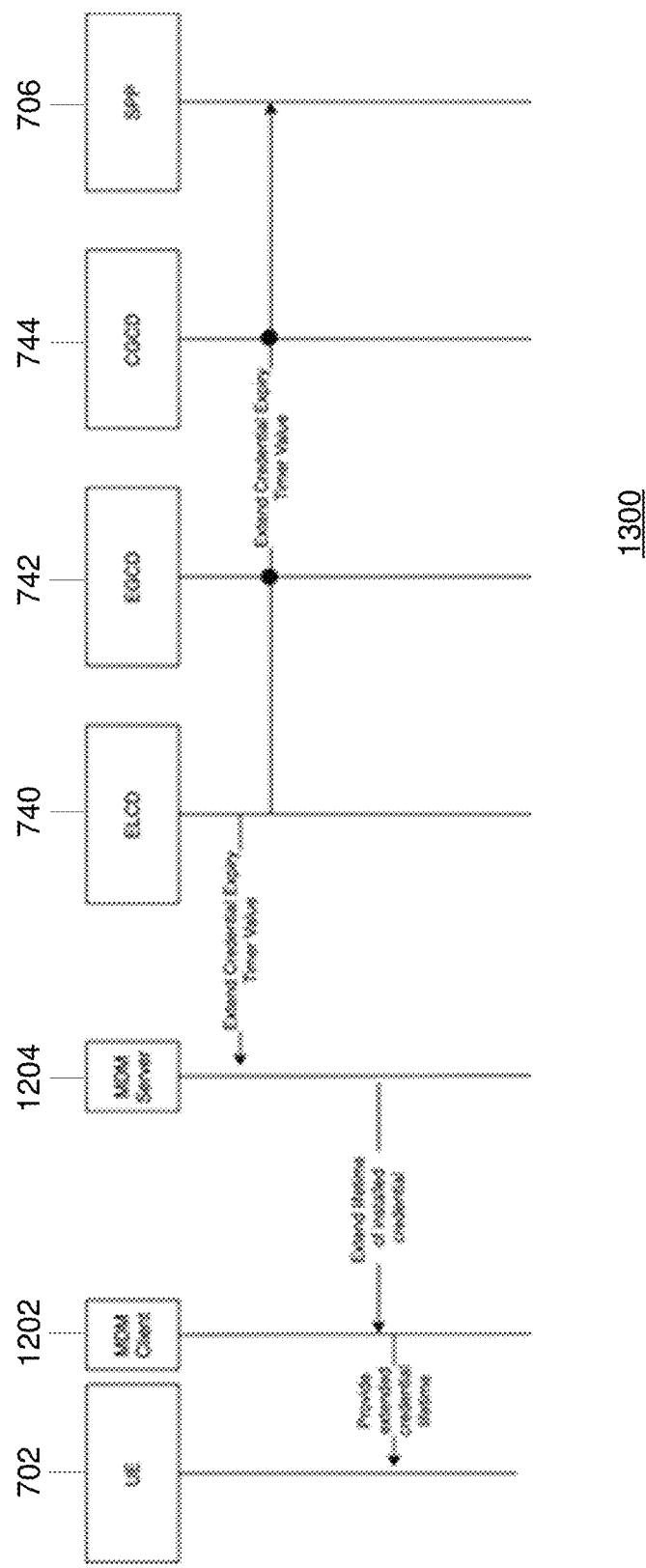
FIG. 13 shows messaging between network components to extend the lifetime of an already provisioned subscriber credential, provisioned and reclaimed using the MDM methodology-based approach of FIG. 12.

Extending the Lifetime of Subscriber Credentials Using the MDM Methodology-Based Approach FIG. 13 shows messaging between network components to extend the lifetime of an already provisioned subscriber credential, provisioned and reclaimed using the MDM methodology-based approach of FIG. 12. The messages between the various network components allow for the SIM provisioning platform from the Enterprise Network to extend the lifetime associated with an already provisioned credential. The UE 702 is informed of the extended credential lifetime via the MDM procedures described above with reference to FIG. 12.

This provides support mechanisms to release installed eSIM credentials from the UE. In addition, there is a support for a credential to be released from the UE implicitly after a timeout period. Furthermore, a support mechanism has been disclosed for the eSIM provisioning platform to initiate clearing of the eSIM credential from the UE. An MDM-based procedure is disclosed that provides lifetime of a credential and that also permits extending the lifetime of a previously provisioned and installed credential.

SUMMARY

The methods and apparatus described in detail above and shown in the Figures teach techniques and mechanisms for managing user subscription credentials provisioned to user equipment (UEs) and to be released at some future time for reuse and repurposing. UE subscription credentials are managed by various and completely independent entities within wireless networks. For example, MNO UE credentials are independent of Enterprise Network UE credentials. Methods and apparatus are described for reclaiming previously provisioned UE credentials from UEs and their users that no longer have use of their previously provisioned UE credentials. The methods and apparatus allow previously provisioned UE credentials to be deleted from both the UEs and from the wireless network components that manage and maintain the credentials. This saves complexity and costs associated with the accumulation of unused and unnecessary UE subscriber credentials in both the wireless networks and the UEs. The disclosed methods and apparatus also allow deletion of previously provisioned UE credentials from the UEs without the need for users to delete the previously provisioned UE credentials manually or explicitly.

In accordance with the presently disclosed methods and apparatus, UE subscriber credentials are assigned to a first user for a limited time when the first user enters a public location whereat a wireless network operates. The first user is allowed access to the wireless network when the first user is present at or proximate to the location. However, when the first user leaves the location, the previously provisioned subscriber credentials that were assigned to the first user are reclaimed for use by another user. Similarly, the present methods and apparatus allow a subscriber credential to be used for a selected time period and then later reclaimed when, for example, an employee is granted access to an Enterprise Network for the employee's length of employment. Upon the employee's termination of employment, the credentials previously provisioned and assigned to the employee's UE are then reclaimed and reassigned to another (possibly new) employee's UE.

In some embodiments, deprecating of an installed credential on a UE allows the credential to be reclaimed by a provisioning system on the network side. It should be noted that independent of the particular method used to provision and install a credential on a UE, reclamation of the credential is still desirable.

Several methods and apparatus are described for provisioning UEs with SIM credentials (or subscriber credentials), and perhaps more importantly, for reclaiming previously provisioned SIM credentials for reuse and/or repurposing. Four specific methods and apparatus for provisioning UEs with SIM credentials and reclaiming of provisioned credentials are described in detail: (1) a validity timer-based approach to provisioning UEs with SIM credentials and reclaiming of provisioned credentials; (2) a release command-based approach to provisioning UEs with SIM credentials and reclaiming of provisioned credentials; (3) a user-initiated release of previously provisioned SIM credentials; and (4) a Mobile Device Management (MDM) methodology-based approach to provisioning UEs with SIM credentials and reclaiming of provisioned credentials.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An apparatus for use in a wireless communication network, comprising:
   a) a network component within the wireless communication network, the network component configured to monitor a credential validity timer value associated with a predetermined subscriber credential, wherein the predetermined subscriber credential is associated with a first user equipment (UE) that is adapted for use in the wireless communication network;
   b) a credential release module configured to release the predetermined subscriber credential from its association with the first UE upon expiry of the associated credential validity timer value, the network component deleting information necessary to continue use of the predetermined subscriber credential by the first UE;
   c) responsive to the release of the predetermined subscriber credential from its association with the first UE, the network component makes the released subscriber credential available to be assigned and provisioned to a second UE, thereby allowing the second UE access to the wireless communication network;
   d) a plurality of UEs including the first and second UEs;
   e) an Enterprise Local Credential Database (ELCD);
   f) an Enterprise Global Credential Database (EGCD);
   g) a Celona (proprietary) Global Credential Database (CGCD); and
   h) a SIM credential Provisioning Platform (SPP);
      wherein the CGCD specifies and informs the SPP of the credential validity timer value associated with the predetermined subscriber credential, and wherein the SPP provides the predetermined subscriber credential together with the credential validity timer value to the first UE, and wherein upon expiry of the credential validity timer value the first UE sends a message to the SPP thereby releasing the predetermined subscriber credential for reuse by the wireless communication system.

2. The apparatus for use in a wireless communication network of claim 1, wherein the SIM credential Provisioning Platform (SPP) extends the lifetime of the predetermined subscriber credential by increasing the credential validity timer value associated with the predetermined subscriber credential.

3. An apparatus for use in a wireless communication network, comprising:
   a) a network component within the wireless communication network, the network component configured to monitor a credential validity timer value associated with a predetermined subscriber credential, wherein the predetermined subscriber credential is associated with a first user equipment (UE) that is adapted for use in the wireless communication network;
   b) a credential release module configured to release the predetermined subscriber credential from its association with the first UE upon expiry of the associated credential validity timer value, the network component deleting information necessary to continue use of the predetermined subscriber credential by the first UE; and
   c) responsive to the release of the predetermined subscriber credential from its association with the first UE, the network component makes the released subscriber credential available to be assigned and provisioned to a second UE, thereby allowing the second UE access to the wireless communication network,
   wherein the credential validity timer value is associated with the predetermined subscriber credential in accordance with a Mobile Device Management (MDM) methodology-based approach, wherein the credential validity timer value is associated with the predetermined subscriber credential using MDM entitlement policies information, and wherein the predetermined subscriber credential associated with the first UE and the associated validity timer value are communicated in MDM messages between an MDM server and an MDM client.

4. The apparatus for use in a wireless communication network of claim 3, wherein the MDM client resides within the first UE and the MDM server is a network component of the wireless communication network, and wherein the MDM client in the first UE releases the predetermined subscriber credential upon expiry of the associated validity timer value.

5. The apparatus for use in a wireless communication network of claim 4, wherein the lifetime of the predetermined subscriber credential is extended by increasing the credential validity timer value associated with the predetermined subscriber credential.

* * * * *